(12) United States Patent
Morgan

(10) Patent No.: US 7,320,468 B2
(45) Date of Patent: Jan. 22, 2008

(54) SEALING ARRANGEMENT

(75) Inventor: Jonathan J. Morgan, Swindon (GB)

(73) Assignee: Rolls-Royce PLC, London (GB)

( * ) Notice: Subject to any disclaimer, the term of this patent is extended or adjusted under 35 U.S.C. 154(b) by 183 days.

(21) Appl. No.: 10/693,524

(22) Filed: Oct. 27, 2003

(65) Prior Publication Data

US 2004/0150164 A1 Aug. 5, 2004

(30) Foreign Application Priority Data

Nov. 15, 2002 (GB) ............................ 0226685.6

(51) Int. Cl.
*F16J 15/44* (2006.01)
(52) U.S. Cl. .................. 277/422; 277/400; 277/581
(58) Field of Classification Search ............. 277/355, 277/422, 400, 581, 579, 545
See application file for complete search history.

(56) References Cited

U.S. PATENT DOCUMENTS

| | | | | |
|---|---|---|---|---|
| 2,598,176 A | | 5/1952 | Johnstone | |
| 2,964,339 A | * | 12/1960 | Macks | 277/422 |
| 3,439,924 A | * | 4/1969 | Ludewig et al. | 277/422 |
| 3,523,692 A | * | 8/1970 | Otto | 277/366 |
| 3,561,773 A | * | 2/1971 | Baumann et al. | 277/579 |
| 3,756,673 A | * | 9/1973 | Strub | 384/117 |
| 3,869,135 A | | 3/1975 | Diederich | |
| 3,997,175 A | * | 12/1976 | Geary | 277/422 |
| 4,598,913 A | | 7/1986 | Kotzur | |
| 4,998,739 A | * | 3/1991 | Weiler | 277/422 |
| 5,403,019 A | * | 4/1995 | Marshall | 277/413 |
| 5,558,341 A | * | 9/1996 | McNickle et al. | 277/400 |
| 5,632,493 A | * | 5/1997 | Gardner | 277/411 |
| 5,934,684 A | | 8/1999 | Brandon et al. | |
| 6,338,490 B1 | | 1/2002 | Bainachi | |
| 6,527,274 B2 | * | 3/2003 | Herron et al. | 277/301 |
| 6,540,231 B1 | * | 4/2003 | Trantow et al. | 277/355 |
| 6,572,113 B2 | * | 6/2003 | Care | 277/410 |

FOREIGN PATENT DOCUMENTS

| | | |
|---|---|---|
| EP | 0 899 490 A2 | 3/1999 |
| EP | 1 130 294 A2 | 9/2001 |
| FR | 2.030.994 | 11/1970 |
| GB | 634878 | 3/1950 |
| GB | 2 368 100 A | 4/2002 |

* cited by examiner

*Primary Examiner*—Alison K. Pickard
(74) *Attorney, Agent, or Firm*—Oliff & Berridge, PLC.

(57) ABSTRACT

A sealing arrangement for sealing a leakage gap between relatively moveable parts in a flow path between a region of high fluid pressure and a region of low fluid pressure comprises a sealing member having an upstream surface, a downstream surface, a radially outer surface and a radially inner surface, the sealing member being in communication with a housing via a resilient element. The resilient element is fixedly joined to the upstream surface of the sealing member such that during operation both the radial force induced on the sealing member by fluid flowing axially into and circumferentially over the radially inner surface and the axial force induced on the sealing member because of a pressure difference across the sealing member is resisted by the resilient element.

28 Claims, 7 Drawing Sheets

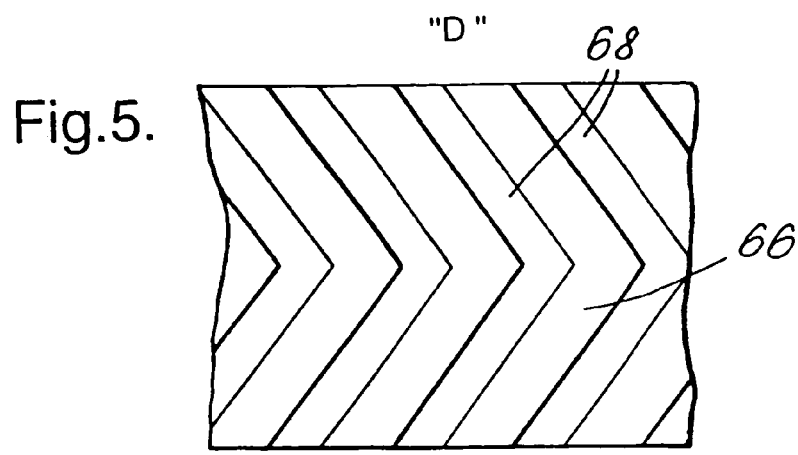
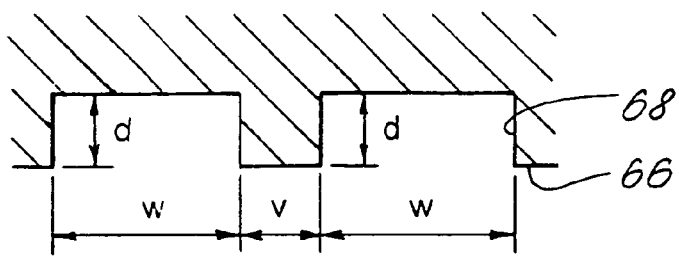
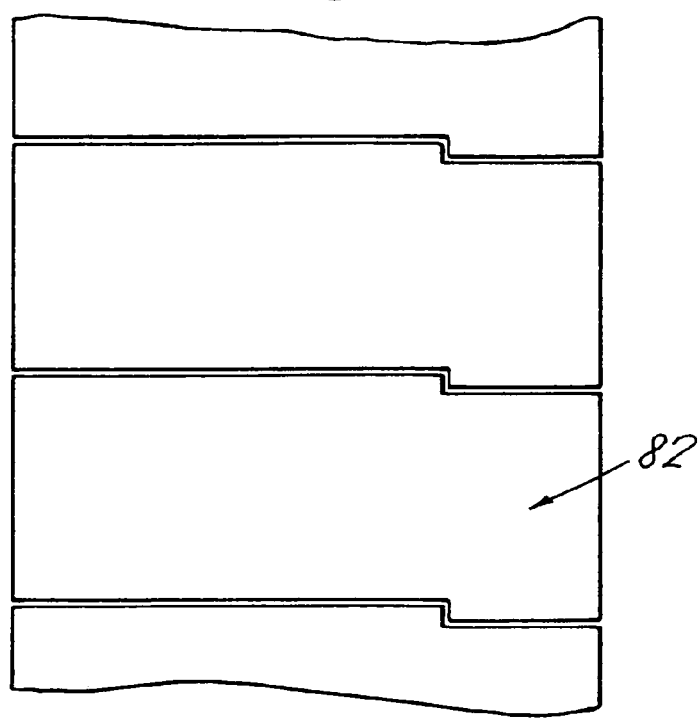

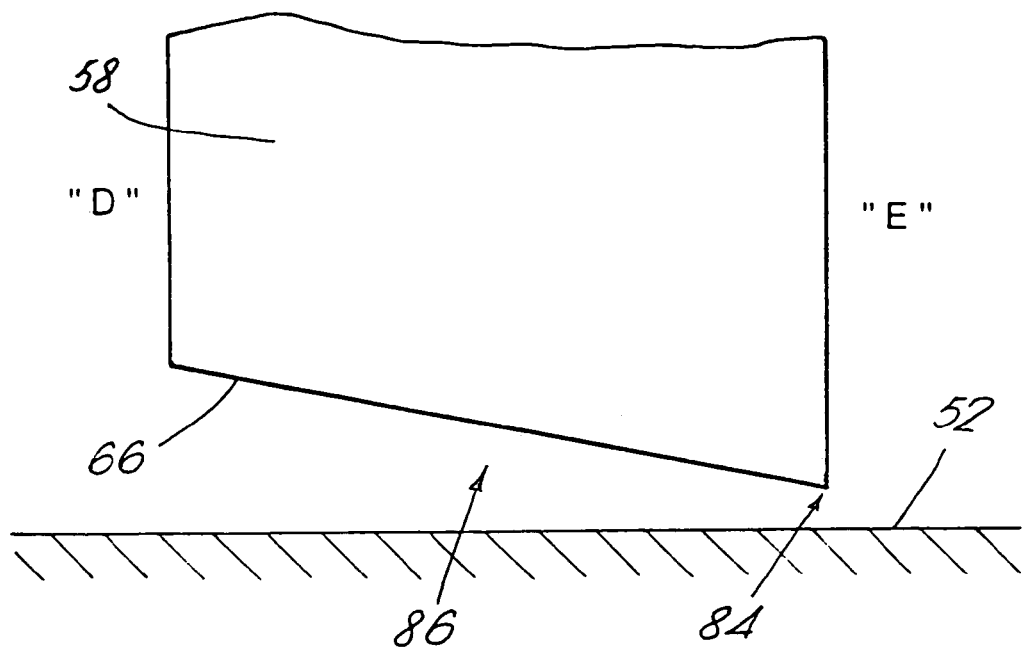
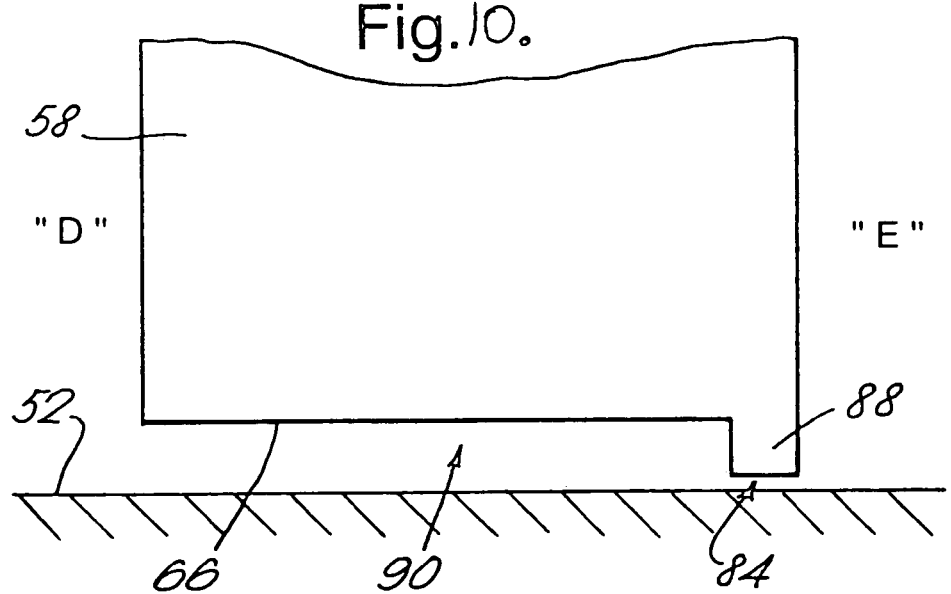

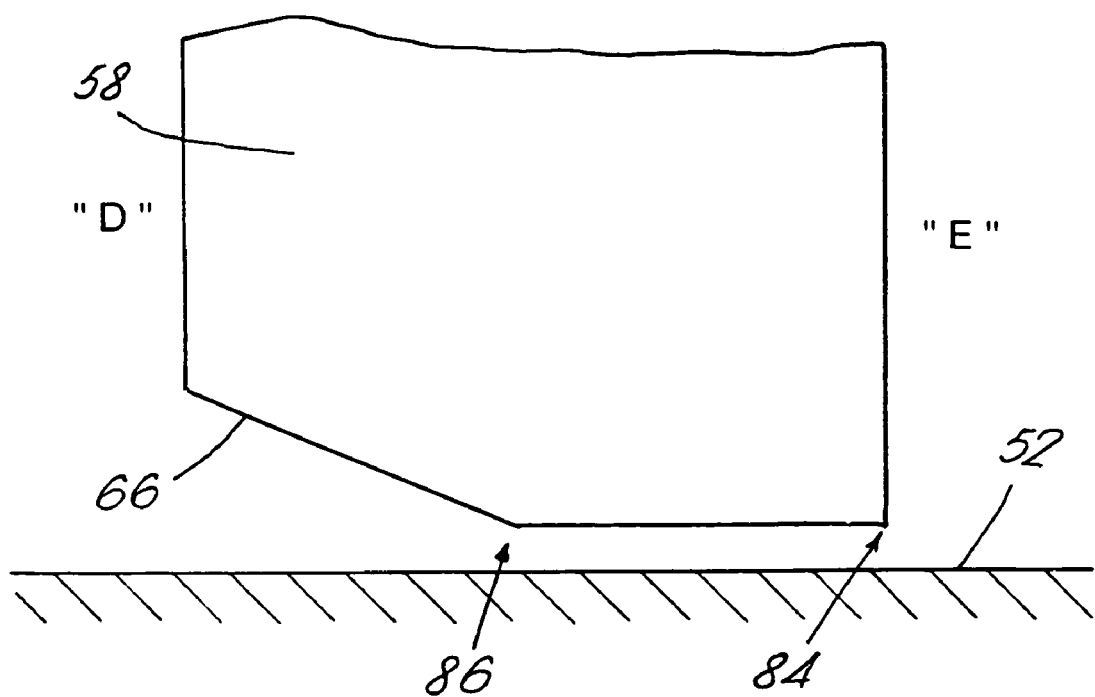

SEALING ARRANGEMENT

This application claims priority to GB 0226685.6, filed Nov. 15, 2002, the subject matter of which is incorporated herein in its entirety by reference thereto.

BACKGROUND

The invention is a sealing arrangement. In particular it refers to a sealing arrangement for turbo machinery.

The sealing arrangement can be employed to maintain a seal in any suitable rotating machinery including, but not limited to, gas turbine engines.

In a conventional gas turbine engine, a fan is used for pressurising ambient air which is then passed downstream to a compressor to be further compressed. The air is then mixed with fuel in a combustor, ignited and burned to expand the gas, increasing the gas temperature. Energy is extracted from the gas by passing it through a turbine prior to being exhausted. The engine may have a high pressure turbine which powers the compressor, and a low pressure turbine which powers the fan.

The rotatable sections of an engine typically comprise annular arrays of large fan blade rotors and smaller compressor and turbine rotor blades, the blades normally being interspaced with annular arrays of static aerodynamic guide vanes (commonly referred to as stator vanes). Each set of rotor blades and stator vanes is referred to as a stage. The stator vanes ensure the gas impinges on the rotor at the correct angle. In the turbine section in some types of engine they also serve to increase the velocity and reduce the pressure of the gas.

The rotatable components extend radially outward from supporting discs or drums which are fixedly joined to a shaft and are rotatable about the axis of the shaft. The shaft may vary in diameter along its length and may comprise radial extensions in order to interface with a component such as a seal.

Hereinbefore and hereafter a radial direction is taken to mean direction perpendicular to the longitudinal axis of the rotor, and an axial direction is taken to mean a direction parallel to the longitudinal axis of the rotor.

Concentric alignment and rotatable support of the shaft and other rotatable components within a surrounding casing is maintained by bearings, which are in communication with the engines static support structure. The bearings also act as a means to transmit vibratory, aerodynamic and centrifugal loads into the engine support structure. During normal operation the rotating components are dynamically balanced.

The compressor and turbine stator vanes remain stationary relative to the rotors and so are normally fixedly joined to the compressor or turbine casings respectively. To enable the engine to operate efficiently, the gas path through the engine must be sealed to prevent losses through leakage. Hence the stators must seal against the drums of the compressor and turbine effectively so that gas being worked only travels down the desired gas path.

There are a number of interfaces between rotatable and static surfaces that require sealing. Typically sealing is required at fan exit; at the inter stage of the intermediate and high pressure compressor; at the high pressure compressor discharge location; at the high pressure turbine pre-swirl position and the low and intermediate pressure turbine inter stage locations. This list is not exhaustive. Sealing is required at any air-to-air sealing location where a reduction in leakage results in a performance benefit.

An air seal can be achieved by the use of a labyrinth seal. These are not designed to form a physical barrier, but rather to form a tortuous route for the air such that there is a controlled but minimal leakage through the seal.

Another solution is the use of segmented seals, which adapt to conform about a rotating shaft. However, the pressure differential across the seal face may force the segments against their housing, reducing their mobility and hence reducing their sealing efficiency.

Both the aforementioned seals are prone to leakage when there are large radial shaft or drum movements and the shaft and seal may be damaged if the displacement is large enough. Likewise seals employing piston ring type sealing arrangements may get locked into position by wear or abuse.

Brush seals are also employed and although they offer an improvement in sealing, they have not seen wide spread use in "heavy duty" sealing applications within gas turbine engines. One problem with brush seals is that the pressure differential across the bristle pack compresses the bristle pack axially against the backing plate of the seal. As a result the bristles wear quickly and ultimately the brush seal performs poorly, acting in effect as a single fin labyrinth seal.

SUMMARY

According to the present invention there is provided a sealing arrangement for sealing a leakage gap between relatively moveable parts in a flow path between a region of high fluid pressure and a region of low fluid pressure comprising a sealing member having an upstream surface, a downstream surface, a radially outer surface and a radially inner surface, the sealing member being in communication with a housing via resilient means wherein the resilient means is fixedly joined to the upstream surface of the sealing member such that during operation both the radial force induced on the sealing member by fluid flowing axially into and circumferentially over the radially inner surface and the axial force induced on the sealing member because of a pressure difference across the sealing member is resisted by the resilient means.

Preferably the radially inner surface of the sealing member is provided with a plurality of channels passing from the upstream surface to the downstream surface.

The invention provides a seal between two volumes at different pressures in rotatable machinery. As previously mentioned, one location where sealing is required is the interface between a static structure and a rotatable surface. The interface between a stator vane and a compressor rotor or turbine rotor (sometimes referred to as a compressor drum or turbine drum) is one such location.

The sealing arrangement comprises a ring of sealing members, which may be continuous or segmented. The segments may interconnect or simply abut one another. The sealing arrangement comprises a housing rigidly fixed to, in this example, the stator and located at the interface between the stator and the rotor. The housing provides support and location for a resilient means, such as a spring cantilever. The resilient means in turn supports a sealing member. A large pressure drop across the sealing arrangement will induce large axial forces on the sealing member. The resilient means provides axial support for the sealing member, thereby preventing the sealing member from becoming forced and locked against the downstream side of the housing.

The radially inner surface of the sealing member is configured such that, in operation, it generates hydrodynamic and/or hydrostatic lift. It does this by retaining fluid in a small clearance volume between the radially inner surface and the rotors. This is referred to as hydrodynamic and/or hydrostatic lubrication or "air riding". The retained fluid provides an air seal between the two volumes whilst also preventing wear of the adjacent surfaces.

The lift generated by the air riding geometry may need to be supplemented at low shaft speeds by ventilation passages that allow fluid at upstream pressure to ventilate the sealing members radially inner surface, thus providing additional hydrostatic lift.

The device is particularly suited to "high duty" sealing requirements in rotating machinery where differential pressures, relative radial movements and relative surface speeds are high. Hydrodynamic and/or hydrostatic lift will increase as the relative speed between the radially inner surface and rotor is increased, resulting in a stiffer film of air being generated. This will help to prevent contact between the sealing member and the rotor during transient movements. At steady state high speed conditions there may be a tendency for a larger than desired clearance which may result in higher leakage. However the leakage will still be low compared to a conventional seal.

BRIEF DESCRIPTION OF THE DRAWINGS

The invention and how it may be constructed and operated, will now be described in greater detail with reference, by way of example, to an embodiment illustrated in the accompanying drawings, in which:

FIG. 5 shows an enlarged view of the radially inner surface.

FIG. 6 is a cross sectional view of the radially inner surface

FIG. 7 shows a possible form of interconnecting segments as they would appear at the interface between the sealing arrangements housing and the static support structure.

FIG. 8 shows a wedge shaped profile on the radially inner surface.

FIG. 9 shows an alternative wedge shaped profile on the radially inner surface.

FIG. 10 shows a flange formed on the radially inner surface.

FIG. 1 illustrates the main sections of a gas turbine engine 2. The overall construction and operation of the engine 2 is of a conventional kind, well known in the field, and will not be described in this specification beyond that necessary to gain an understanding of the invention. For the purposes of this description the engine is divided up into five sections—a fan section 4; a compressor section 6, a combustor section 8 and a turbine section 10, collectively known as the "engine core"; and a bypass section 12. The compressor 6 and turbine 10 comprise stator vanes 14 and rotor blades 16,17 respectively. Air, indicated generally by arrow "A", enters the engine 2 via the fan section 4, constrained on one side by an outer wall 18 and on the other by a discontinuous inner wall 20. Support for the inner wall 20 and the engine core is provided by an array of support members 22 which extend radially towards, and are in communication with, the outer wall 18. The inner wall 20 comprises several static and rotatable sections, the details of which are not required here to appreciate the invention. The air is compressed and the airflow is split, passing downstream through the bypass 12 and to the compressor 6, as indicated generally by "B" and "C" respectively. The air is further pressurised by the compressor 6, a proportion of which enters the combustion section 8, the remainder of the air being employed elsewhere. Fuel is injected into the combustor airflow, which mixes with air and ignites before exhausting out of the rear of the engine via the turbine section 10.

Figure 1:
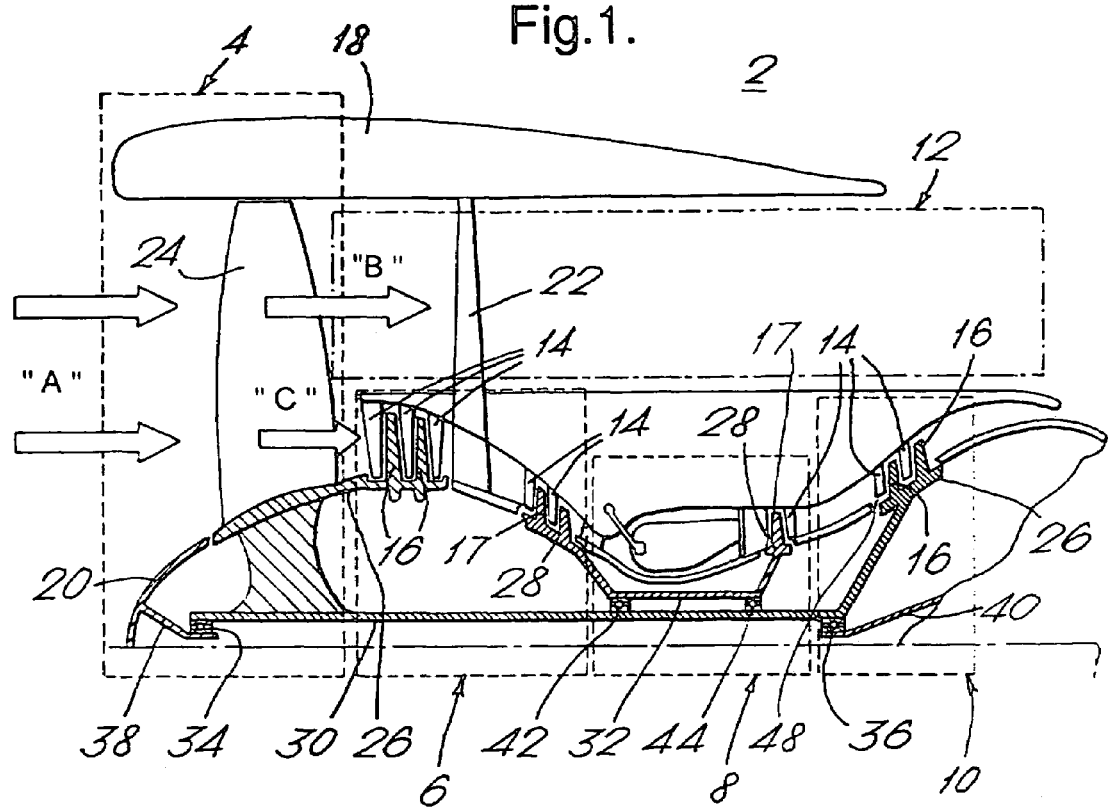
FIG. 1 is a pictorial representation of a cross section of a typical gas turbine engine incorporating a sealing arrangement in accordance with the present invention.

In this embodiment the low pressure rotor blades 16 in the compressor 6 and turbine 10 are fixedly joined to form a low pressure rotor drum 26. The fan blades 24 and low pressure drum 26 are fixedly joined to a first shaft 30 that is rotatable about the central axis of the engine 2. Likewise the high pressure rotor blades 17 in the compressor 6 and turbine 10 are fixedly joined to form a high pressure drum 28, which are fixedly joined to a second shaft 32 that is rotatable about the central axis of the engine 2 and is coaxial with the first shaft 30.

The first shaft 30 is rotatably supported by bearings 34 at the upstream end of the shaft and by bearings 36 at the downstream end. First and second static members 38 and 40 support the bearings 34 and 36 respectively, which are in communication with a static section of the inner wall 20. The second shaft 32 is rotatably supported by bearings 42 at the upstream end of the shaft and by bearings 44 at the downstream end. A sealing arrangement is fixedly attached to the inner diameter of the second shaft 32 between the bearings 42 and 44. A sealing arrangement 48 is fixedly attached to stator vanes 14.

Figure 2:
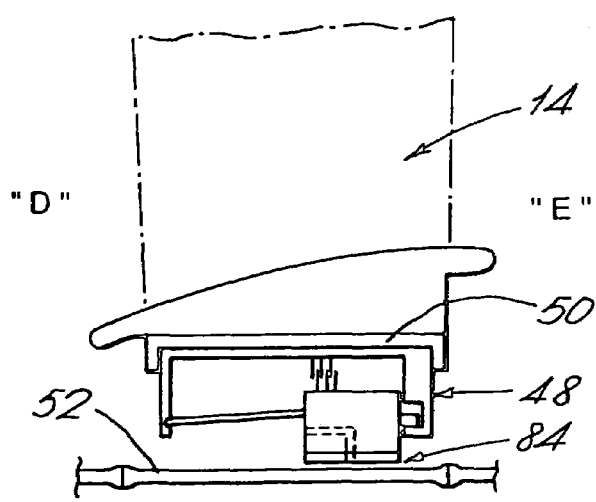
FIG. 2 is a pictorial representation of a typical interface between a static stator vane and rotatable drum incorporating a sealing arrangement in accordance with the present invention.

Presented in FIG. 2 is an enlarged view of the interface between the sealing arrangement 48 and the turbine stator vane 14, which, in this embodiment, acts as a static support structure 50. The sealing arrangement 48 is disposed around a first rotatable member 52 and joined to said static support structure 50. The first rotatable member 52 represents any rotatable surface, such as the low pressure rotor drum 26 or the high pressure rotor drum 28. The details of how the sealing arrangement 48 is joined to the static support structure 50 are not key to understanding the operation of the sealing arrangement 48. Relative to the sealing arrangement 48 there is a region of high pressure upstream and a region of relatively low pressure downstream, indicated by "D" and "E" respectively.

Figure 3:
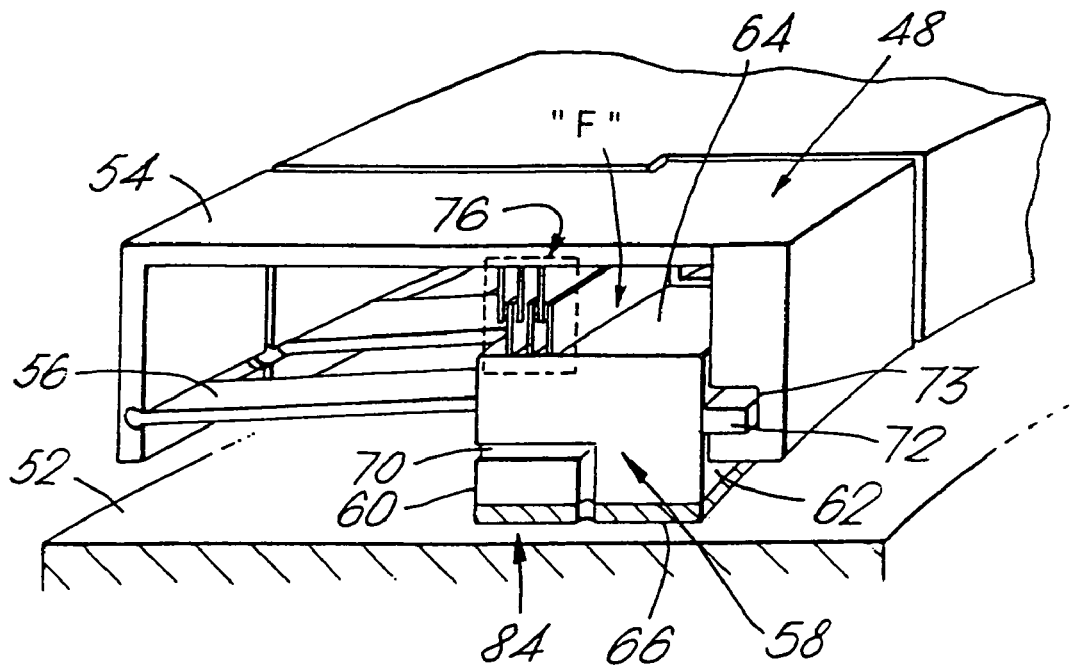
FIG. 3 shows an enlarged view of a sealing arrangement.
Figure 4:
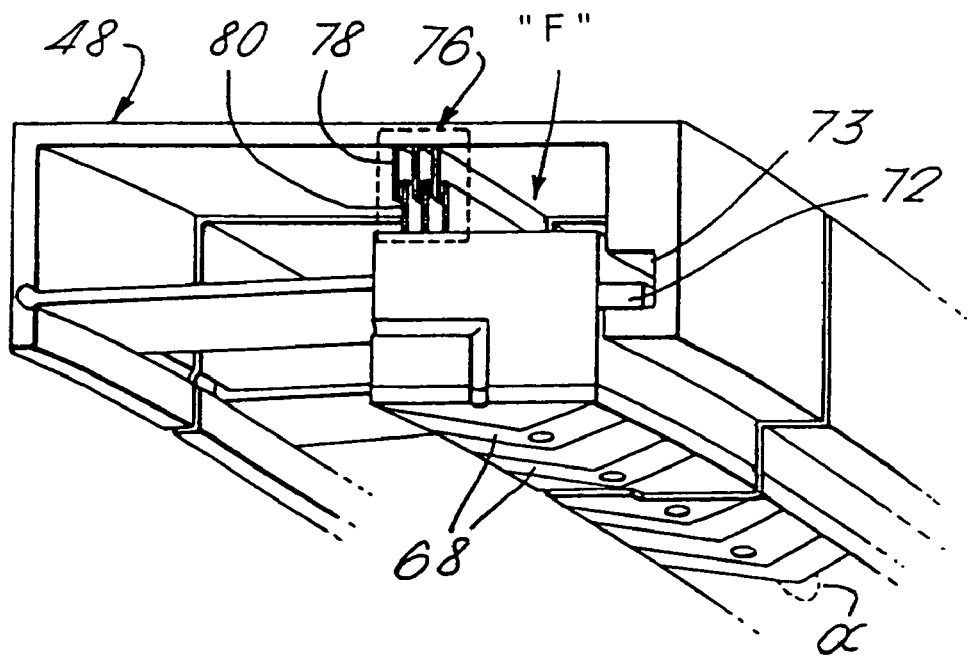
FIG. 4 is an alternative view of the sealing arrangement, showing a radially inner surface.

A further enlarged view of the sealing arrangement 48 is presented in FIGS. 3 and 4. For clarity the static support structure 50 is not shown.

The sealing arrangement 48 comprises a housing 54 fixedly joined to a resilient means 56 which is in turn in communication with a sealing member 58 having an upstream surface 60, a downstream surface 62, a radially outer surface 64 and a radially inner surface 66. The sealing member 58 is provided with a plurality of channels 68 passing from the upstream surface 60 to the downstream surface 62 across the radially inner surface 66.

As presented in FIG. 5, the channels 68 are formed on the radially inner surface 66 such that they have at least one change of direction. "D" and "E" indicate the upstream and downstream sides of the sealing member 58 respectively.

The channels 68 have a right-angled cross section, as shown in FIG. 6. The channels 68 have a depth "d" in the range of about 0.5 μm to 10 μm and a width "w" in the range of about 0.1 mm to 15 mm with an adjoining land "v" approximately one third of the channel width. The precise dimensions will depend upon the desired hydrodynamic and/or hydrostatic film thickness.

The sealing member 58 is provided with at least one ventilation passage 70 which extends from the upstream surface 60 to the radially inner surface 66. The downstream surface 62 of the sealing member 58 is provided with a sealing means 72. The sealing means 72 is formed as a radially resilient ring located in a circumferential groove 73 provided in the housing 54. In operation the sealing means 72 is in sliding contact with the housing 54 and the sealing member 58. In an alternative embodiment the sealing means 72 is formed as a discontinuous ring, sometimes referred to as a split ring. The sealing means 72 is selected from at least one of a group of materials comprising steel alloys, nickel alloys, bronze, carbon graphite, silicon nitride, silicon carbide, zirconia, alumina, zialon and stellite. It would be appreciated by a man skilled in the art that this list is not exhaustive.

There is also provided a sealing device 76 positioned upstream of the sealing means 72 and generally radially directed, creating a seal between the housing 54 and the sealing member 58 and a chamber indicated generally by "F". The precise configuration of the sealing device 76 is not important, but it may take the form of labyrinth seal, with inner and outer annular flanges 78 and 80 respectively in communication with the housing 54 and the sealing member 58 respectively. The flanges 78 and 80 are configured such that despite any relative radial movement between the housing 54 and the sealing member 58 a tortuous route is provided such that there is a controlled but minimal leakage through the seal. This ensures that the chamber "F" remains at a slightly lower pressure than the air upstream of the sealing device 76. With this arrangement the sealing member 58 is free to ride on the film of air trapped by the radially inner surface 66 and not inhibited by high pressure air forcing the sealing member 58 towards the first rotatable member 52.

As previously described the sealing arrangement 48 is formed as a ring and disposed around a first rotatable member 52. The ring may be continuous or divided into segments for ease of installation. Each segment can simply abut the other or, as shown the view of the external diameter of the ring in FIG. 7, is formed as interconnecting segments 82, thereby providing a tortuous fluid leakage route such that there is a controlled but minimal leakage through the seal.

The resilient means 56, sealing device 76, sealing means 72, housing 54 and sealing member 58 may each be formed as a continuous ring or comprise a series of simply abutted or interconnecting segments. Additionally, per segment, the resilient means 56 may be formed out of one or more elements.

In operation the seal between the high fluid pressure region D and the low fluid pressure region E is maintained by fluid retained in the small clearance volume 84 between the radially inner surface 66 and the first rotatable member 52. Studies to date indicate that optimum performance is achieved by maintaining a clearance 84 greater than about 1 μm but less than about 5 μm. The channels 68 are configured such that air is "scooped" into the clearance volume 84 where it has significant residence time, forming an hydrodynamic and/or hydrostatic or "air riding" seal.

It is imperative that the radially inner surface 66 be maintained. In operation, during startup or shutdown or when at rest, the radially inner surface 66 may contact the first rotatable member 52. To prevent erosion the radially inner surface 66 may be provided with an erosion resistant coating or surface treatment, selected from at least one of a group of materials comprising nitrided steel, carburised steel, hard anodised aluminium, tungsten carbide, chrome carbide, titanium carbide, titanium nitride. It would be appreciated by a man skilled in the art that this list is not exhaustive.

If the clearance 84 increases because of relative radial movement between the radially inner surface 66 and the first rotatable member 52, the film pressure generated in the clearance 84 will fall resulting in a radially inward displacement of the sealing member 58. Conversely if the clearance 84 decreases because of relative radial movement between the radially inner surface 66 and the first rotatable member 52 the pressure generated in the clearance 84 increases thus forcing the sealing member 58 to move outwards.

Relative radial displacements of the static support structure 50 and the first rotatable surface 52 may lead to unfavourable increases in the clearance 84. Additionally the radial forces generated on the radially inner surface 66 as a result of the hydrodynamic and/or hydrostatic lift may also act to unfavourably affect the clearance 84. The resilient means 56 provides radial support for the sealing member 58, thereby controlling the clearance 84.

In order to maintain the clearance 84 to within acceptable limits during operation, the radial resilience of the resilient means 56 is balanced against the radially outward force generated by the hydrodynamic and/or hydrostatic film in clearance 84. The resilient means 56 is configured such that when the relative speed between the radially inner surface 66 and the first rotatable member 52 is substantially zero the radially inner surface 66 abuts or is in close proximity to the first rotatable member 52. Additionally the resilient means 56 is configured such that when the relative speed between radially inner surface 66 and the first rotatable member 52 is low the radially outward force produced by the hydrodynamic film pressure is sufficient to counteract the radially inward force of the resilient means 56, thereby maintaining the clearance 84. Additionally the resilient means 56 is configured such that when the relative speed between radially inner surface 66 and the first rotatable member 52 is high the resilient means 56 counteracts the radially outward force to such a degree that the clearance 84 is maintained.

An additional resilient means may be required to maintain the clearance 84 between the first rotatable member 52 and radially inner surface 66. Any suitable means may be employed to achieve this, such as, by way of non limiting example, a garter spring provided around the radially outer surface 64 of the sealing member 58.

Additionally the resilient means 56 is configured such that it resists axial force induced on the sealing member 58 because of a pressure difference across the sealing member 58. In this way the sealing member 58 is prevented from becoming forced and locked against the housing 54.

In order to provide additional lift at low shaft speeds the radially inner surface 66 of the sealing member 58 is formed such that in operation a clearance 84 is maintained between the first rotatable member 52 and the radially inner surface 66 which is larger at the upstream end of the sealing member 58 than it is at the downstream end, forming a wedge shaped interspace 86, as shown in FIG. 8.

Alternatively, as shown in FIG. 9, the sealing member 58 may be formed with a radially inner surface 66 which is wedge shaped towards the upstream side of the sealing member 58, but is substantially parallel with the first rotatable member 52 towards the downstream side of the sealing member 58.

Alternatively, as shown in FIG. 10, a circumferential flange 88 is provided substantially towards the downstream end of the radially inner surface 66 of the sealing member 58, forming a rectangular shaped interspace 90.

In all of the above described embodiments the interspace 86,90 ensures that even at zero or very low shaft speeds a clearance 84 is provided between the between the radially inner surface 66 and the first rotatable member 52. The interspace 86,90 is filled with air from the high pressure region "D" which forms a hydrodynamic and/or hydrostatic film, thereby producing lift and exerting a radial outward force on the sealing member 58.

Figure 11:
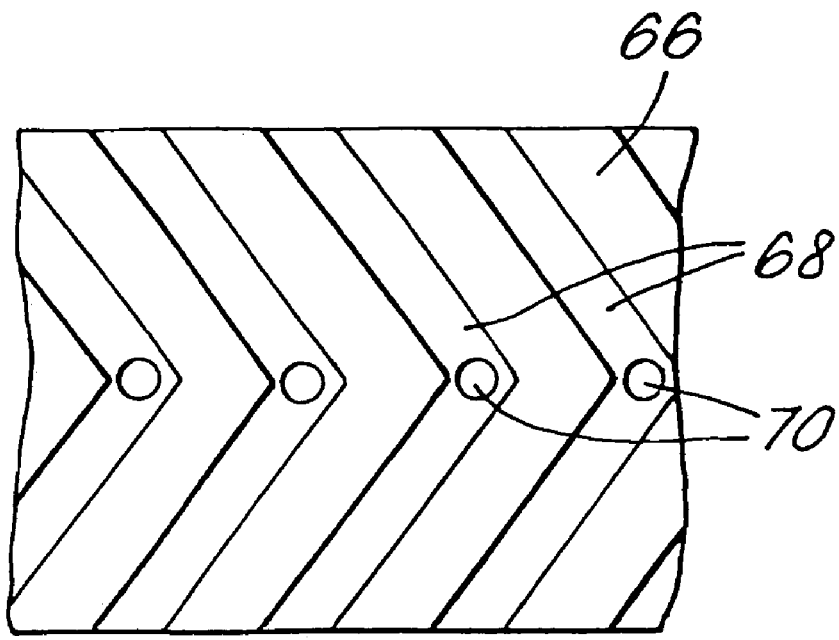
FIG. 11 shows passages exhausting to the radially inner surface.
Figure 12:
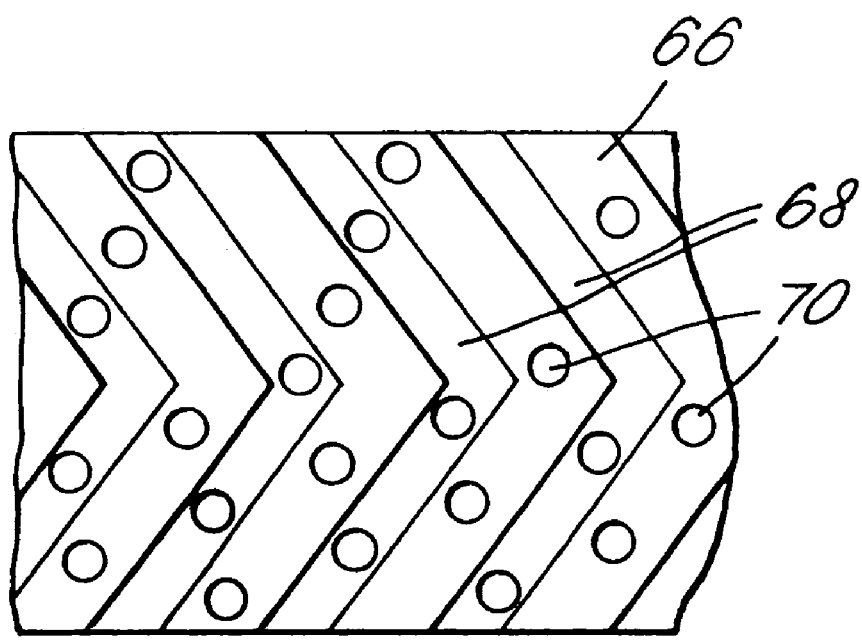
FIG. 12 shows passages exhausting to the radially inner surface.

The lift generated by the radially inner surface 66 may need to be supplemented when the relative speed of the radially inner surface 66 and the first rotatable member 52 is low. The ventilation passages 70 allow the communication of fluid from the high pressure region D to the radially inner surface 66, thereby providing additional hydrostatic lift. Additionally the passages 70 may contain restrictions to limit the flow of air at higher relative speeds, thus minimising the clearance 84 and maximising sealing performance at a design condition. The passages 70 terminate on the radially inner surface 66 along a common circumferential line, as shown in FIG. 11. Alternatively, as shown in FIG. 12, the passages 70 may be configured to terminate on the radially inner surface 66 in a less regular order.

Figure 13:
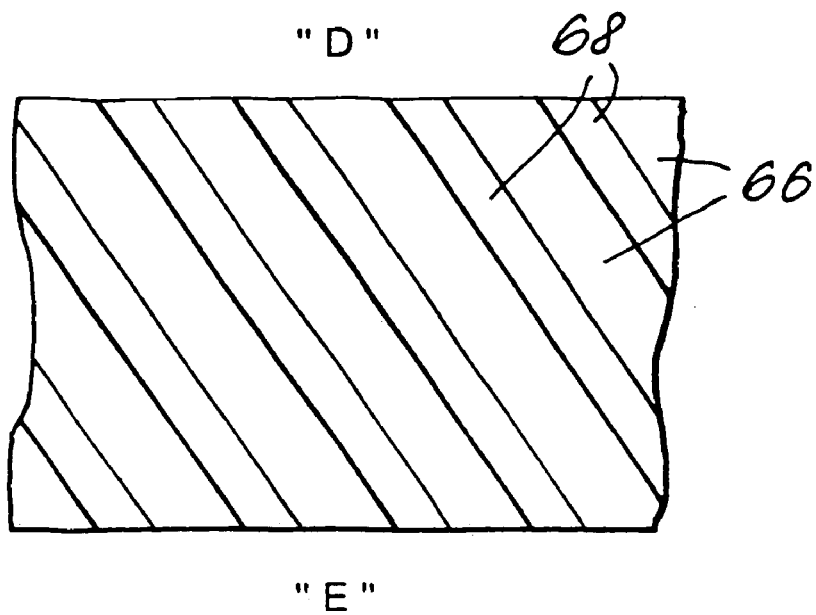
FIG. 13 shows an alternative embodiment of the radially inner surface configuration.

In an alternative embodiment the channels 68 formed on the radially inner surface 66 of the sealing member 58, as presented in FIG. 13, are provided at an angle to the axial direction of the sealing plane.

Figure 14:
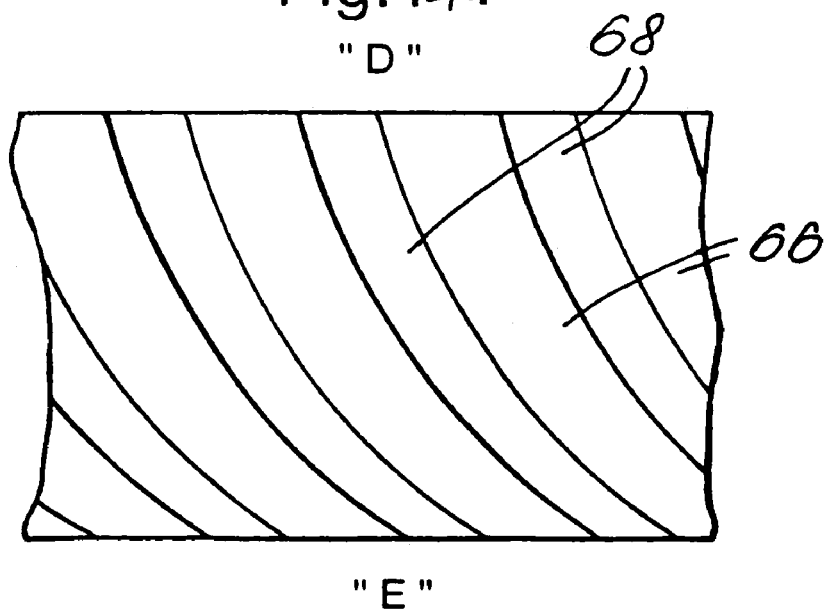
FIG. 14 shows a further alternative embodiment of the radially inner surface configuration.

In a further alternative embodiment, as presented in FIG. 14, the channels 68 are provided with an arcuate form at an angle to the axial direction of the sealing plane.

The sealing arrangement 48 can be used to maintain a seal in any rotating machinery including, but not limited to gas turbine engines.

The configurations shown in FIGS. 1 to 14 are diagrammatic. The design and positioning of the sealing arrangement, rotor blades, bearings, fan casing and other parts may vary. Likewise the combination and configuration of these components will vary between designs.

The invention claimed is:

1. A sealing arrangement for sealing a leakage gap between relatively moveable parts in a flow path between a region of high fluid pressure and a region of low fluid pressure, the sealing arrangement comprising:
    a hydrodynamic circumferential sealing member having an upstream surface, a downstream surface, a radially outer surface and a radially inner surface; and
    a resilient element that attaches the sealing member to a housing, wherein
    the resilient element is fixedly joined to the upstream surface of the sealing member such that during operation both a radial force induced on the sealing member by fluid flowing axially into and circumferentially over the radially inner surface and an axial force induced on the sealing member because of a pressure difference across the sealing member is resisted by the resilient element, and
    sealing means is provided between the downstream surface of the sealing member and the housing, the sealing means formed as a radially resilient ring located in a circumferential groove provided in the housing such that in operation the sealing means is in sliding contact with the housing and the sealing member.

2. A sealing arrangement as claimed in claim 1 wherein said radially inner surface of the sealing member is provided with a plurality of channels passing from the upstream surface to the downstream surface.

3. A sealing arrangement as claimed in claim 2 wherein the channels have a depth in the range of about 0.5 µm to 10 µm and a width in the range of about 0.1 mm to 15 mm with an adjoining land approximately one third of the channel width.

4. A sealing arrangement as claimed in claim 2 wherein said plurality of channels have at least one change of direction.

5. A sealing arrangement as claimed in claim 2 wherein said plurality of channels are arcuate.

6. A sealing arrangement as claimed in claim 1 wherein said resilient element is formed as a cantilever.

7. A sealing arrangement as claimed in claim 1 wherein said housing is formed as a ring.

8. A sealing arrangement as claimed in claim 1 wherein said sealing arrangement is divided into a plurality of interconnecting segments.

9. A sealing arrangement as claimed in claim 8 wherein the resilient element is formed out of one or more elements for each of the interconnecting segments.

10. A sealing arrangement as claimed in claim 1 wherein the sealing arrangement is disposed around a first rotatable member and fixedly joined to a static support structure.

11. A sealing arrangement as claimed in claim 10 wherein said first rotatable member is a shaft.

12. A sealing arrangement as claimed in claim 10 wherein said first rotatable member is a drum.

13. A sealing arrangement as claimed in claims 10 wherein during operation a clearance is maintained between the sealing member and the first rotatable member.

14. A sealing arrangement as claimed in claim 13 wherein the clearance is greater than about 1 µm but less than about 5 µm.

15. A sealing arrangement as claimed in claim 10 wherein the radially inner surface of the sealing member is formed such that in operation a clearance is maintained between the first rotatable member and the radially inner surface which is larger at the upstream end of the sealing member than it is at the downstream end.

16. A sealing arrangement as claimed in claim 15 wherein the radially inner surface is substantially parallel with an adjacent surface of said first rotatable member along at least part of the length of the radially inner surface.

17. A sealing arrangement as claimed in claim 10 wherein a circumferential flange is provided substantially towards the downstream end of the radially inner surface of the sealing member.

18. A sealing arrangement as claimed in claim 10 wherein the resilient element is configured such that it produces a radially inward force on the sealing member which increases as the clearance between the radially inner surface of the sealing member and the first rotatable member increases.

19. A sealing arrangement as claimed in claim 1 wherein the sealing member is pierced providing at least one passage which extends from the upstream surface to the radially inner surface.

20. A sealing arrangement as claimed in claim 19 wherein the sealing member is configured such that the air passing through the at least one passage induces a radially outward displacement of the sealing member.

21. A sealing arrangement as claimed in claim 1 wherein the sealing means is formed as a discontinuous ring.

22. A sealing arrangement as claimed in claim 1 wherein the sealing means is selected from at least one of a group of materials comprising steel alloys, nickel alloys, bronze, carbon graphite, silicon nitride, silicon carbide, zirconia, alumina, zialon and stellite.

23. A sealing arrangement as claimed in claim 1 wherein a sealing device is provided between the housing and the sealing member, said sealing device being positioned upstream of the downstream surface.

24. A sealing arrangement as claimed in claim 23 wherein the sealing device has a upstream surface and a downstream surface and provided with radially extending flanges in communication with the housing and the sealing member configured such that a tortuous route is provided between the upstream surface and the downstream surface of the sealing device such that there is a controlled but minimal leakage through the sealing device.

25. A sealing arrangement as claimed in claim 1 wherein the radially inner surface of the sealing member is provided with an erosion resistant surface.

26. A sealing arrangement as claimed in claim 25 wherein the radially inner surface of the sealing member is coated with at least one of the materials selected from a group comprising nitrided steel, carburised steel, hard anodised aluminium, tungsten carbide, chrome carbide, titanium carbide, titanium nitride.

27. A sealing arrangement as claimed in claim 1 for use in a gas turbine engine.

28. A sealing arrangement as claimed in claim 1 wherein said sealing arrangement is divided into a plurality of segments.

* * * * *